US012659887B2

(12) United States Patent
Mei et al.

(10) Patent No.: US 12,659,887 B2
(45) Date of Patent: Jun. 16, 2026

(54) BEAMFORMING METHOD, BEAMFORMING DEVICE, AND COMPUTER-READABLE STORAGE MEDIUM

(71) Applicant: Vicinity Technologies Limited, Bristol (GB)

(72) Inventors: Xide Mei, Bristol (GB); Man Wai Kwan, Bristol (GB); Zizhou Wang, Bristol (GB); Jihui Zhang, Bristol (GB); Wei Han, Bristol (GB); Kong Chau Tsang, Bristol (GB)

(73) Assignee: Vicinity Technologies Limited, Bristol (GB)

( * ) Notice: Subject to any disclaimer, the term of this patent is extended or adjusted under 35 U.S.C. 154(b) by 79 days.

(21) Appl. No.: 18/419,551

(22) Filed: Jan. 23, 2024

(65) Prior Publication Data

US 2024/0323869 A1     Sep. 26, 2024

(30) Foreign Application Priority Data

Mar. 21, 2023    (CN) .......................... 202310284366.5

(51) Int. Cl.
*H04W 52/42* (2009.01)
*H04B 7/06* (2006.01)
(52) U.S. Cl.
CPC .......... *H04W 52/42* (2013.01); *H04B 7/0617* (2013.01); *H04B 7/0695* (2013.01)

(58) Field of Classification Search
CPC .. H04B 7/0617; H04B 7/0626; H04B 7/0695; H04B 7/088; H04B 7/086; H04B 7/0426; H04W 52/42
See application file for complete search history.

(56) References Cited

U.S. PATENT DOCUMENTS

| | | | | |
|---|---|---|---|---|
| 7,194,237 | B2* | 3/2007 | Sugar ................... | H04B 7/0697 |
| | | | | 455/39 |
| 7,675,886 | B2* | 3/2010 | Agrawal .............. | H04B 7/0615 |
| | | | | 375/267 |
| 2006/0104381 | A1* | 5/2006 | Menon .............. | H04L 25/03343 |
| | | | | 375/267 |
| 2007/0077968 | A1* | 4/2007 | Kuzminskiy ........ | H04B 7/0691 |
| | | | | 455/562.1 |
| 2009/0097395 | A1* | 4/2009 | Zhang .................. | H04B 7/0417 |
| | | | | 370/203 |
| 2011/0210892 | A1* | 9/2011 | Shany ................... | H04W 52/42 |
| | | | | 342/373 |
| 2016/0006122 | A1* | 1/2016 | Seol ........................ | H01Q 3/30 |
| | | | | 342/372 |

(Continued)

*Primary Examiner* — Rebecca E Song
*Assistant Examiner* — Cason H Morse

(57) ABSTRACT

The present application relates to a beamforming method, a beamforming device and a computer-readable storage medium, the beamforming method comprises: the measurement signal is sent one by one for each candidate beam, and the candidate beam is different from each other; obtain the receiving power and phase information of the measurement signals corresponding to each candidate beam received by the receiving end; according to the order of the receiving power from high to low and the power allocation strategy, at least two of the candidate beams are chosen as the target beam; and determine the transmitted beam based on the target beam and the beamforming strategy.

8 Claims, 6 Drawing Sheets

(56) References Cited

U.S. PATENT DOCUMENTS

| | | | |
|---|---|---|---|
| 2016/0353467 A1* | 12/2016 | Nekovee ............. | H04W 72/542 |
| 2018/0219595 A1* | 8/2018 | Liu ....................... | H04B 7/0617 |
| 2021/0184733 A1* | 6/2021 | Cao ..................... | H04B 7/0639 |
| 2021/0409099 A1* | 12/2021 | Zhu ..................... | H04B 7/0865 |
| 2023/0188189 A1* | 6/2023 | Raghavan ............ | H04B 7/0626 |
| | | | 370/252 |
| 2024/0154681 A1* | 5/2024 | Vieira ................... | H04B 17/24 |
| 2025/0081013 A1* | 3/2025 | Echigo ................. | H04W 24/10 |

* cited by examiner

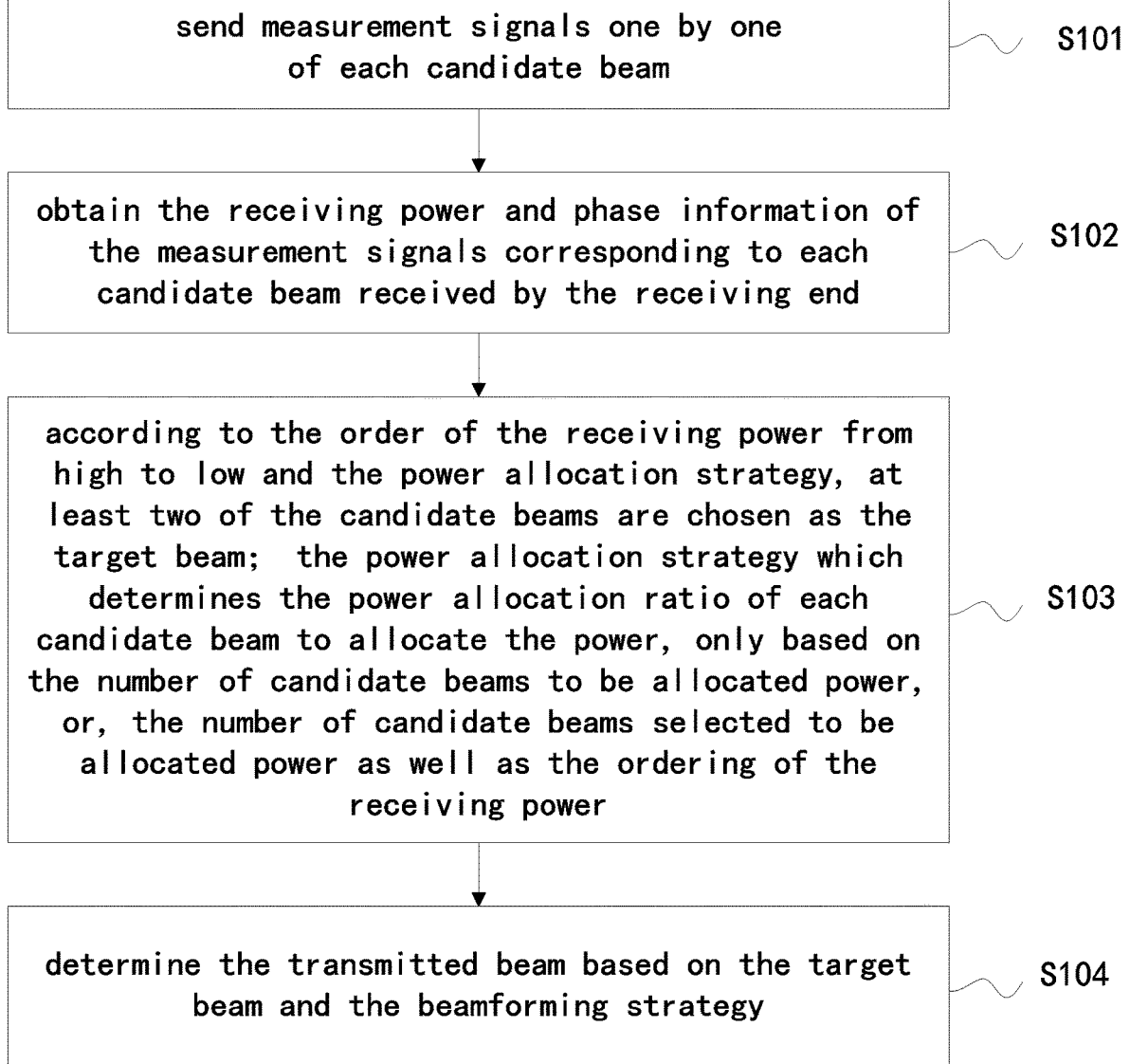

```
send measurement signals one by one
     of each candidate beam                          S101
```

```
obtain the receiving power and phase information of
   the measurement signals corresponding to each     S102
   candidate beam received by the receiving end
```

```
according to the order of the receiving power from
high to low and the power allocation strategy, at
least two of the candidate beams are chosen as the
target beam;  the power allocation strategy which
   determines the power allocation ratio of each     S103
candidate beam to allocate the power, only based on
the number of candidate beams to be allocated power,
  or, the number of candidate beams selected to be
   allocated power as well as the ordering of the
                receiving power
```

```
determine the transmitted beam based on the target
   beam and the beamforming strategy                  S104
```

FIG. 1

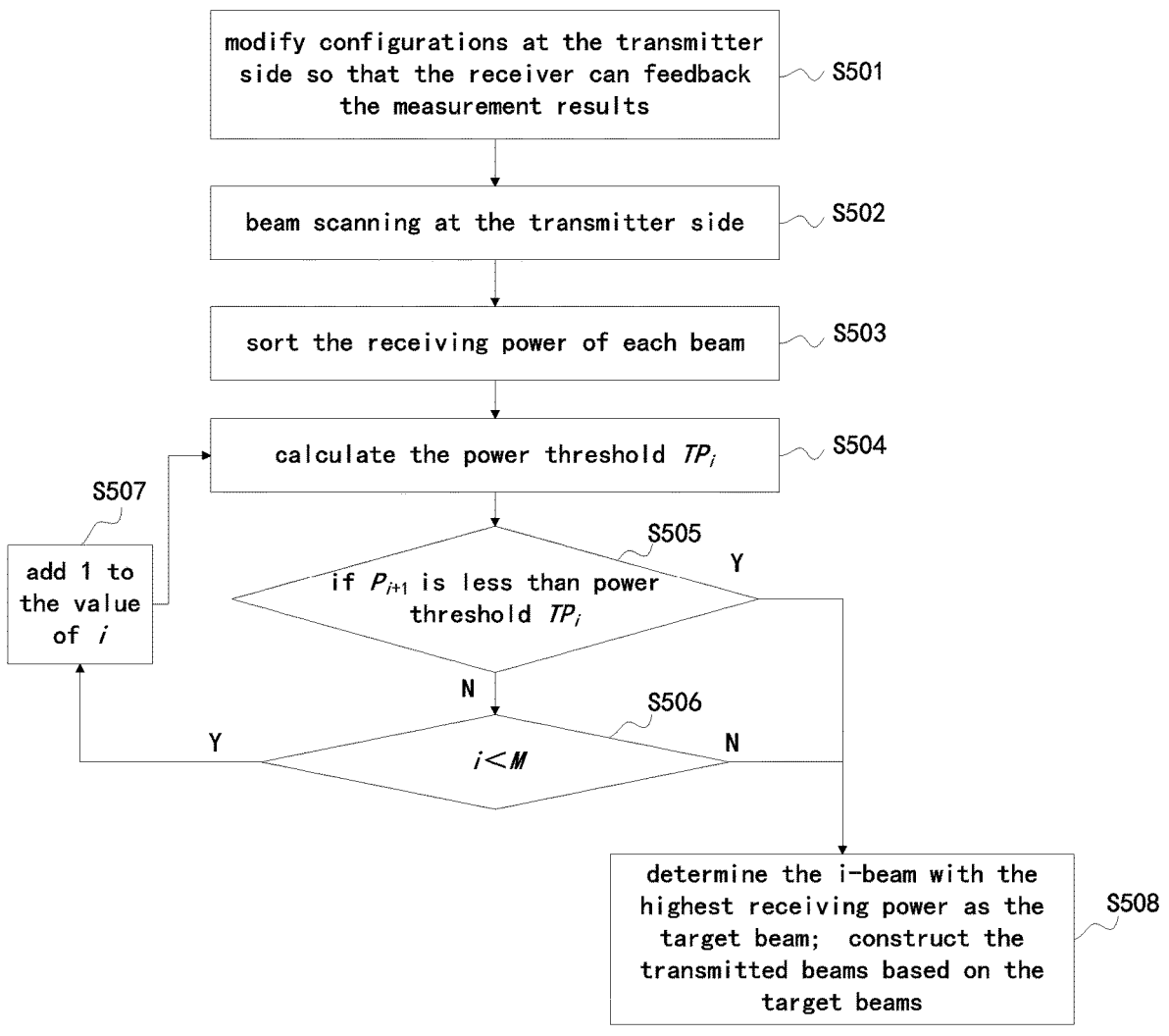

modify configurations at the transmitter
side so that the receiver can feedback
the measurement results — S501 beam scanning at the transmitter side — S502 sort the receiving power of each beam — S503 calculate the power threshold $TP_i$ — S504

S507 add 1 to
the value
of $i$

S505 if $P_{i+1}$ is less than power
threshold $TP_i$     Y

N

S506

$i < M$     N

Y determine the i-beam with the
highest receiving power as the
target beam; construct the
transmitted beams based on the
target beams     S508

FIG. 5

| SSB 0 | SSB 1 | SSB 2 | SSB 3 | ...... | SSB M |
|---|---|---|---|---|---|

BEAMFORMING METHOD, BEAMFORMING DEVICE, AND COMPUTER-READABLE STORAGE MEDIUM

CROSS REFERENCE TO RELATED APPLICATIONS

The present application claims the benefit of Chinese Patent Application No. 202310284366.5 filed on Mar. 21, 2023, the contents of which are incorporated herein by reference in their entirety.

TECHNICAL FIELD

The present application relates to the field of communications, in particular to a beamforming method, a beamforming device, and a computer-readable storage medium.

BACKGROUND

In the development process of modern communication technology, beamforming technology has always been regarded as one of the most important technologies by major companies and research institutions. Beamforming aims at increasing the receiving power on the receiving side with a fixed transmit power at the transmitting side. The target shape of beams is achieved through controlling the feeding amplitude as well as phase of a multi-antenna system. The target shape of beams is designed to radiate high-gain beam in a specific direction. The increase of the receiving power at the receiving side will directly improve the received signal strength at the receiving side, thereby improving the range of the received signal, and also improve the signal quality, therefore it can directly improve the system throughput and noise resistance of the entire system. Usually, beamforming can be divided into two stages, the first stage is beam scanning, that is, the transmitting side forms different beams, and then let the receiving side feedback the measurement results; the second stage, according to the measurement results, assign a specific form of transmission signal, so as to achieve the purpose of beamforming. However, the existing beamforming method used in related technologies requires complex calculations and consumes a lot of system resources.

Therefore, how to achieve beamforming with simple and low consumption is an urgent problem that needs to be solved.

SUMMARY

Technical Problem

In view of the deficiencies of the above related techniques, the object of the present application is to provide a beamforming method, a beamforming device and a computer-readable storage medium, which is designed to solve the problem that beamforming requires complex calculations and consumes a large amount of system resources.

Technical Solution

Provided is a beamforming method, comprised:
sending the measurement signal one by one for each candidate beam, and the candidate beam is different from each other;

obtaining the receiving power and phase information of the measurement signals corresponding to each candidate beam received by the receiving end;

choosing at least two candidate beams as target beams according to the order of the receiving power from high to low and the power allocation strategy; the power allocation strategy which determines the power allocation ratio of each candidate beam to allocate the power, only based on the number of candidate beams to be allocated power, or, the number of candidate beams selected to be allocated power as well as the ordering of the receiving power; and determining the transmitted beam is based on the target beam and the beamforming strategy, the transmitted beam includes all the target beams, and the phase term of each target beam is compensated based on the phase information; the power allocation ratio based the power allocation ratio calculated in the power allocation strategy.

Based on the same inventive concept, the present application further provides a beamforming device, which is comprised of a processor, a memory and a communication bus;

the communication bus is configured to realize the connection communication between the processor and the memory;

the processor is configured to execute one, or, more programs stored in memory to implement the steps of the beamforming method described above.

Based on the same inventive concept, the present application further provides a computer-readable storage medium, which stores one or more programs, and the program or programs may be executed by one or more processors to achieve the beamforming method steps described above.

Beneficial Effects of the Present Invention

The present application provides a beamforming method, a beamforming device, and a computer-readable storage medium, wherein the above beamforming method, only based on the number of candidate beams to be allocated power, or, combined with the receiving power sequencing to determine the power allocation ratio of each candidate beam to allocate power. The power distribution method is simple and direct, without considering the specific value of the receiving power, without using complex algorithms to determine the power of each candidate beam and saving system resources; moreover, the selection of target beams is selected in order of receiving power from highest to lowest, which is conducive to obtaining better system performance.

The above beamforming device could be realized through the simple and easy-to-use beamforming process without complex calculations.

The above computer-readable storage media storage program enables a simple and easy-to-use beamforming process without the need for complex calculations.

BRIEF DESCRIPTION OF THE DRAWINGS

FIG. 1 is a schematic flow diagram of the beamforming method provided in an embodiment of the present application;

FIG. 5 is a schematic diagram of a process of beamforming provided in another optional embodiment of the present application;

FIG. 6 is a schematic view of performing beam scanning provided by another optional embodiment of the present application;

EMBODIMENTS

Figure 2:
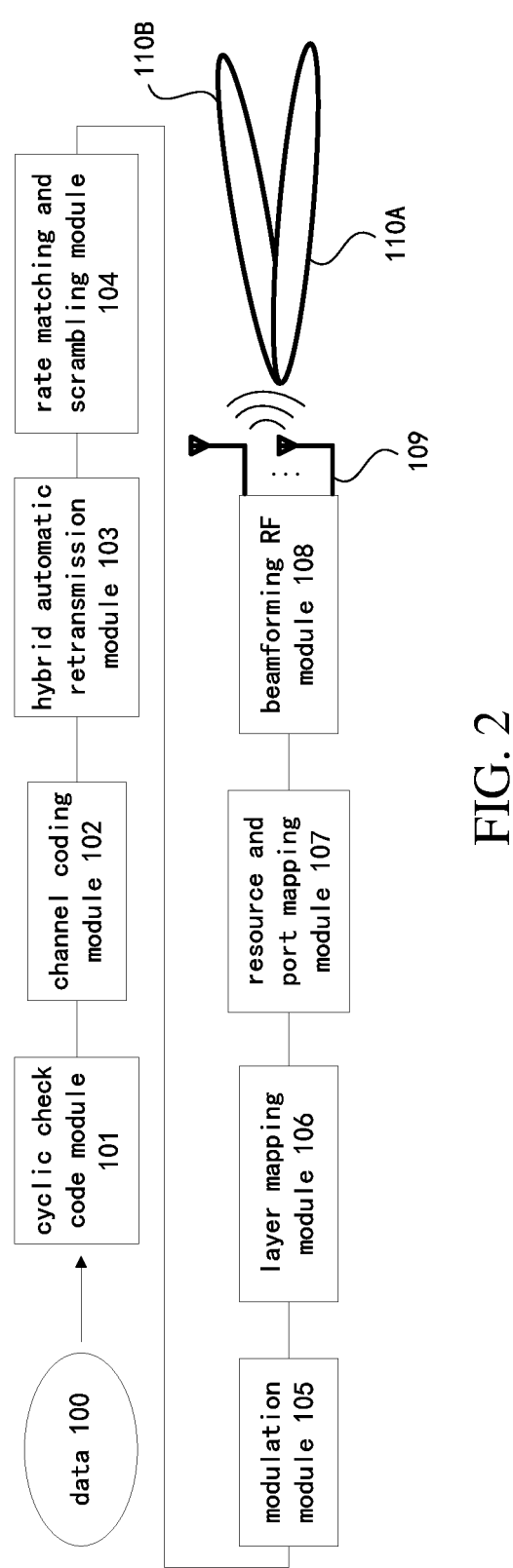
FIG. 2 is an exemplary structure of an NR system provided by another optional embodiment of the present application.

In order to facilitate the understanding of the present application, a more comprehensive description of the application will be described below with reference to the relevant drawings. A better embodiment of the present application is given in the drawings. However, the present application may be implemented in many different forms and is not limited to the embodiments described herein. On the contrary, the purpose of providing these embodiments is to enable the public to understand the disclosure of the present application more thoroughly and comprehensively.

Unless otherwise defined, all technical and scientific terms used herein have the same meaning as those commonly understood by those skilled in the technical art of the present application. The terms used herein in the description of the present application are only for the purpose of describing specific embodiments and are not intended to limit the present application.

The beamforming process in related technologies is complex and occupies a lot of system resources.

Based on these aspects, the present application is intended to provide a solution to the above technical issues, the details of which will be described in subsequent embodiments.

EMBODIMENT

The presented embodiment provides a beamforming method, the beamforming method may be applied to the transmitting end, to obtain the transmitted beam of the transmitted signal, see FIG. 1, the beamforming method of the presented embodiment includes, but is not limited to:

S101, send measurement signals one by one of each candidate beam.

In the presented embodiment, a plurality of candidate beams may be formed, each candidate beam is different from each other, the excitation vector of each selected beam may be stored at the transmitting end, and these excitation vectors will also be used for the formation of subsequent transmitted beams. The beamforming method of the presented embodiment is similar to the operation in related techniques before the executing of the beamforming that is to perform beam scanning process. During beam scanning process, the transmitter sends the measurement signal through the candidate beam. The measurement signal can be arbitrary, as long as the receiver can receive the measurement signal and correctly feedback its receiving power and phase information. For example, in some implementations, the measurement signal can be a signal related to the transmitter configuring resources for the receiver, such as SSB (synchronization signal block), the transmitter sends the configuration of the resource to the receiver, and the receiver feeds back the measurement results to the transmitter based on the configured resource. When sending the measurement signal, the same transmit power is used for different candidate beams.

S102, obtain the receiving power and phase information of the measurement signals corresponding to each candidate beam received by the receiving end.

The receiving end may continuously measure the receiving power and phase information of each measurement signal sent by each candidate beam and feedback to the transmitter, and in this process, the presented embodiment doesn't limit other parameters that can characterize the signal quality can be measured and fed back at the same time. It should be noted that the receiving power in the present application may be RSRP (Reference Signal Receiving Power) or any other parameters that can characterize the signal receiving power. The feedback of the receiving side can be real-time feedback for each candidate beam, or it can be fed back to the transmitter after all candidate beam scans are completed and for this aspect, the presented embodiment doesn't have any limit. However, it should be understood that after the transmitter receives feedback from the receiver, the receiving power and phase information corresponding to each candidate beam should be clearly resolved at the transmitter side.

S103, according to the order of the receiving power from high to low and the power allocation strategy, at least two of the candidate beams are chosen as the target beam; the power allocation strategy which determines the power allocation ratio of each candidate beam to allocate the power, only based on the number of candidate beams to be allocated power, or, the number of candidate beams selected to be allocated power as well as the ordering of the receiving power.

It should be noted that the power allocation strategy is pre-set by the management based on actual requirements, which can be written to the transmitter for storage, or obtained by other means by the transmitter.

S104, determine the transmitted beam based on the target beam and the beamforming strategy.

The transmitted beam includes all target beams, each of which compensates for the phase based on phase information and distributes power according to the power allocation ratio. In short, the target beam determined in combination with the aforementioned step S103 obtains the transmitted beam. It should be understood that the total power transmitted cannot exceed its upper limit, and the transmitted beam is not equivalent to the simple superposition of the target beam, but the total transmitted power is distributed to each target beam according to the power allocation ratio to form a transmitted beam, in this process, the transmitting power when transmitting the transmitted beams is the same as the transmission power when transmitting each candidate beam.

In related technologies, multi-beam forming requires the use of a second type of codebook, or the creation of a large number of packets for channel estimation, and complex algorithms such as water-filling algorithms may be used in the beamforming process to accurately calculate the power allocation ratio of each beam, which requires a lot of system resources. In the above beamforming method of the presented embodiment is only based on the number of candidate beams to allocate power, or, the number of candidate beams combined with the receiving power sequencing to determine the power allocation ratio of each candidate beam, the power allocation algorithm is simple and direct, which does not consider the specific value of the received signal power, and does not need to use complex algorithms to determine the power allocation ratio of each candidate beam; moreover, the selection of target beams is selected in order of receiving power from highest to lowest, which is intuitively able to obtain better system performance.

The beamforming method described above in the presented embodiment can simply and directly determine the double beam or multiple beam transmission, and some embodiments can improve the transmission quality of the signal. In the real communication scenario, better communication quality is usually required, in order to further enhance the communication capability of the system, the influence of each candidate beam on the overall performance of the system can be considered when selecting the target beam, and the number of candidate beams is beneficial to the overall performance of the system, so that the transmitted beam can achieve a relatively good signal transmission.

In some embodiments, according to the order of receiving power from high to low, and the power allocation strategy, at least two of the candidate beams are chosen as the target beam comprises:

Increase the number of target beams one by one in the order of receiving power from highest to lowest, until the total receiving power of the target beam meets the preset conditions, or the number of target beams reaches a predetermined maximum number. That is to say, the target beams are selected in the demands of the target total receiving power or the number of target beams of interest. Assuming that a communication system is capable of forming four beams, the four candidate beams with the highest receiving power are determined to be the target beams, and beamforming is performed based on these target beams, which can achieve the higher total receiving power while meeting the requirements of the number of beams. The total receiving power is the theoretical total receiving power of these candidate beams with respect to the corresponding power allocation ratio.

As a way of selecting the candidate beam, in some embodiments, the number of target beams is increased one by one in the order of receiving power from high to low, until the total receiving power of the target beam meets the preset conditions, or, the number of target beams reaches a predetermined maximum number is comprised of:

S201, according to the order of the receiving power from high to low, i candidate beams are determined as the target beams; the value of i gradually increases from 2 until any one of the first predetermined conditions is met.

Assuming that the maximum number of candidate beams is M, M can be an integer greater than or equal to 2, and for illustration, M in this example is greater than 2. The receiving power of these candidate beams is measured and fed back by the receiver. For example, each candidate beam is sorted in order of receiving power from highest to lowest, and its serial number is set to 1 to M in order, wherein the candidate beam 1 and candidate beam 2 (that is, the candidate beam with the highest and second highest receiving power), where i is equal to 2. In the same way, when i equals 3, the target beam includes candidate beam 1, candidate beam 2 and candidate beam 3, that is, the three candidate beams with the highest receiving power.

In the presented embodiment, the first predetermined condition comprises:

Condition 1: the increase in the total receiving power of the first i+1 candidate beam compared to the total receiving power of the first i candidate beams does not exceed the first threshold compared, and the first threshold is not lower than 0.

Condition 2, the value of i is equal to the maximum number of supported candidate beams.

It is understood that in order to determine whether the above condition one is met, the total receiving power of the first i and the first i+1 candidate beams is calculated in the presented embodiment. Since the first threshold is greater than 0, if condition one is not met, the total receiving power of the first i+1 beams is not less than the total receiving power of the first i beams. As an example, suppose that the total receiving power of the first 3 candidate beams increases compared with the total receiving power of the first 2 candidate beams, and the increase is greater than the first threshold; then compare the total receiving power of the first 4 candidate beams with the first 3 candidate beams, assuming that the total receiving power of the first 4 candidate beams is less than the total receiving power of the first 3 candidate beams, and the increase is less than 0, which must be less than the first threshold, therefore, the 3 candidate beams are chosen as the target beams, that is, the beams chosen for the following beamforming process are candidate beam 1, candidate beams 2 and candidate beam 3. It is understood that the presented embodiment is selected by the candidate beam with the highest receiving power, if the first threshold is 0, then the total receiving power of the target beam determined in some embodiments will be the combination of the largest total receiving power in all combinations of the candidate beams, which can make the system provide a larger total receiving power under the same total transmit power, thereby improving the transmission quality of the signal, improving the throughput of the system and the ability to noise resistance. In some implementation processes, the first threshold can also be a value greater than 0, and the first threshold can be adjusted according to actual demands.

If the above conditions 1 and 2 are not met, it means that the number of target beams can continue to increase, and continuing to increase the target beam can achieve higher total receiving power, which can improve the communication capability of the system.

For the above two conditions, the target beams are determined when only either of them is reached. The assessment of the above condition two is relatively simple, in this example, that is, when i is equal to M, condition two is satisfied. In practical applications, it can also be determined whether the above condition two is met first. If the condition is met, the current candidate beam can be directly determined as the target beam.

The total receiving power can be calculated based on the receiving power of each candidate beam, taking the first two beams of candidate beams as an example, namely, candidate beam 1 and candidate beam 2. Assuming that the receiving power feedback at the receiving side is $P_1$ and $P_2$ respectively, the two beams with constructive interference phase are transmitted at the same time at the transmitting side, and the total receiving power $P_{total}$ can be written as Formula 1:

$$P_{total} = \left[ \sqrt{aP_1} + \sqrt{(1-a)P_2} \right]^2 \quad \text{(Formula 1)}$$

where a and (1-a) are the power allocation ratios of candidate beam 1 and candidate beam 2, respectively, and a is a value between 0-1. It is understood that the power allocation strategy in the present application is based on the number of candidate beams to allocate power, or, combined with the ordering of receiving power to determine the power allocation ratio. For illustrative purposes, in this example, the number of candidate beams z for on-demand power allocation is used as an example, that is, the power allocation ratio of each candidate beam to be allocated power is 1/z. For example, when the power is evenly allocated, the value of the above a is 0.5. For non-uniform allocation, based on the power allocation ratio of each candidate beam which is determined by the power allocation strategy, the specific value of a can be known. The variables involved in the power allocation strategy of the present application are relatively simple, and the predetermined variables can be substituted, and the process does not require complex calculations.

For the total receiving power of more than two beams, the calculation method is similar, in order to facilitate understanding, taking the maximum number of M beams as an example, based on the number M of the beams to be distributed power, the power allocation ratio of each candidate beam is determined to be 1/M, and the total receiving power $P_{total}$ can be calculated by the following formula 2:

$$P_{total} = \left[ \sqrt{\frac{P_1}{M}} + \sqrt{\frac{P_2}{M}} + \sqrt{\frac{P_3}{M}} + \ldots + \sqrt{\frac{P_{M-1}}{M}} + \sqrt{\frac{P_M}{M}} \right]^2 \quad \text{(Formula 2)}$$

Since the power allocation of M beams in this example is 1/M, for the implementation of other power allocation ratios, the receiving power of the beam is multiplied by the actual power allocation ratio. $P_1, \ldots, P_M$ is the receiving power of the $1^{st}$ to $M^{th}$ candidate beams in order of receiving power from highest to lowest.

By calculating the total receiving power of different number of candidate beams, the number of candidate beams that makes the total receiving power of the system higher can be determined, and the system can be better performance. Also, the total receiving power can be obtained only by simple algebraic calculation, without complex calculations, simple and easy to use.

In some embodiments, as another method of selecting the candidate beams, a plurality of candidate beam as the target beam is determined from high to low based on the receiving power and the predetermined power allocation strategy, including:

S301, obtain the second threshold corresponding to the first i candidate beams in the order of receiving power from high to low.

Same as the previous embodiments, assuming that the maximum number of candidate beams is M, M could be an integer greater than or equal to 2, and M in the presented embodiment is greater than 2. The receiving power of these candidate beams is measured and fed back by the receiver.

In the presented embodiment, the total receiving power of these candidate beams is not directly derived, but a second threshold is first calculated, and the second threshold of the present application satisfies the following conditions: if the receiving power of the i+1 candidate beam is not lower than the second threshold, the total receiving power of the first i+1 candidate beam is not less than the total receiving power of the first i candidate beam. It should be noted that the second threshold is related to the following conditions: 1) the actual receiving power of each candidate beam, and there may be different second thresholds for different numbers of candidate beams and 2) the calculation method of the second threshold. The presented embodiment of condition 2 will be described separately later.

S302, according to the order of the receiving power from high to low, i candidate beams are determined as the target beams; the value of i gradually increases from 2 until any of the second predetermined conditions is met.

In the presented embodiment, the second predetermined condition comprises:

Condition 3: the receiving power of the i+1 candidate beam is not higher than the second threshold.

Condition 4: the value of i is equal to the maximum number of supported candidate beams.

The condition 4 mentioned above is the same as condition 2 in the first predetermined condition above, and the following example ignores condition 4 for ease of understanding.

For condition three above, as an example, i=2, the determined target beams include candidate beam 1 and candidate beam 2, and to increase the number of target beams, the candidate beam 3 is added. Determine whether the receiving power $P_3$ of the candidate beam 3 is higher than the corresponding second threshold; if so, the above condition three is not met. Follow the strategy mentioned above, the next step is to determine whether the receiving power $P_4$ of the candidate beam 4 is greater than the corresponding second threshold until it is determined that a candidate beam is not greater than the corresponding second threshold.

In some embodiments, obtain the second threshold corresponding to the first i candidate beams in the order of receiving power from high to low comprises:

A power threshold is calculated such that the total receiving power of the first i+1 candidate beams is equal to the total receiving power of the first i candidate beams, and the power threshold is used as the second threshold.

It is understandable that in some implementations, if the total receiving power of the first i+1 candidate beams is greater than the total receiving power of the first i candidate beams, then increasing the candidate beams can improve the performance of the system. For ease of understanding, the following example still assumes that the power allocation ratio of each candidate beam in the current target beam is 1/(number of current beams), that is, the power allocation strategy is to allocate the power of each beam equally, then the power allocation ratio of each of the two candidate beams is ½, and the total receiving power of the two candidate beams is Formula 3 below:

$$P_{total} = \left[ \sqrt{\frac{P_1}{2}} + \sqrt{\frac{P_2}{2}} \right]^2 \quad \text{(Formula 3)}$$

Let's take the comparison of dual beam and single beam as an example, if $P_{total} \geq P_1$, the transmission of dual beam has better system performance than that of single beam. Combining the above Formula 3 and the critical condition of $P_{total} = P_1$, the power threshold $TP_1$ for dual beam transmission can be calculated through, Formula 4:

$$TP_1(\text{dBm}) = P_1(\text{dBm}) - 7.6(\text{dB}) \quad \text{(Formula 4)}$$

It should be noted that Formula 4 above is represented by converting from a linear scale to a dB scale. Of course, in the present application, the excitation of a single beam is not considered, only the case of dual beams and multiple beams is considered. Similarly, the power threshold corresponding to different numbers of candidate beams can be expressed by the following Formula 5:

$$
\left[\sqrt{\frac{P_1}{3}} + \sqrt{\frac{P_2}{3}} + \sqrt{\frac{TP_2}{3}}\right]^2 = \left[\sqrt{\frac{P_1}{2}} + \sqrt{\frac{P_2}{2}}\right]^2
$$

$$
\left[\sqrt{\frac{P_1}{4}} + \sqrt{\frac{P_2}{4}} + \sqrt{\frac{P_3}{4}} + \sqrt{\frac{TP_3}{4}}\right]^2 = \left[\sqrt{\frac{P_1}{3}} + \sqrt{\frac{P_2}{3}} + \sqrt{\frac{P_3}{3}}\right]^2
$$

$$
\vdots
$$

$$
\left[\sqrt{\frac{P_1}{M}} + \sqrt{\frac{P_2}{M}} + \dots + \sqrt{\frac{P_{M-1}}{M}} + \sqrt{\frac{TP_{M-1}}{M}}\right]^2 = \left[\sqrt{\frac{P_1}{M-1}} + \sqrt{\frac{P_2}{M-1}} + \dots + \sqrt{\frac{P_{M-1}}{M-1}}\right]^2
$$

(Formula 5)

Among them, $TP_2$, $TP_3$, and $TP_{M-1}$ correspond to the power thresholds for the first 3, 4 and M candidate beams. It is understandable that the power threshold of different numbers of candidate beams can be directly calculated based on the receiving power of each candidate beam, and the calculation of the power threshold of different number of candidate beams is independent of each other, so when acquiring the power threshold, the order in which it is acquired is not limited. In some embodiments, all power thresholds can be calculated in advance and compared sequentially with the corresponding candidate beam to be selected. Of course, since the presented embodiment is to determine whether the second predetermined condition is met in the order of the receiving power of the candidate beams. The power thresholds can be obtained one by one, and once the second predetermined condition is not met, the power threshold corresponding to the next candidate beam can be obtained.

The obtained power threshold is used as the second threshold, and when the receiving power of the next candidate beam in sequence is greater than the second threshold, the addition of the candidate beam in the system can increase the total receiving power, thereby achieving better system performance. From this, the resulting target beam allows the system to have a high total receiving power at the current power allocation ratio.

In some embodiments, obtain the second threshold corresponding to the first i candidate beams in the order of receiving power from high to low comprises:

A power threshold is calculated such that the total receiving power of the first i+1 candidate beams is equal to the total receiving power of the first i candidate beams, and the power threshold is compensated to obtain the second threshold.

In practice, for example, a compensation threshold is added to the power threshold as demands. Compensation thresholds can be set on purpose based on specific application requirements. In some implementations, the compensation threshold should not be the value less than 0 to ensure the improvement of the overall performance of the system.

The strategy to determine the target beam of the above example is to obtain the second threshold as the decision threshold, so as to determine which candidate beams can be transmitted in the communication. The calculation method of the second threshold is quite simple, which can be obtained by simple algebraic calculation. The decision-making process is also simple and direct, without complex calculations. Also, for different numbers of candidate beams, the second threshold can be different which is able to compensate independently for greater flexibility.

In the foregoing example, when calculating the total receiving power of each candidate beam, the uniform power allocation power strategy is used as an example. However, the power allocation strategy of the presented embodiment is not limited to the uniform distribution. In some embodiments, the power allocation strategy comprises any of the following:

Strategy 1: Based on the number z of the candidate beams to be allocated power, the power allocation ratio of each candidate beam is determined to be 1/z. That is, the uniformly allocated power for candidate beams mentioned in the previous example. In practice, this strategy is actually equivalent to very simple power allocation, in which there is no special power allocation preference between each candidate beam, which can further simplify the beamforming process.

Strategy 2: The power allocation ratio of each candidate beam decreases in order of the receiving power from highest to lowest, and the sum of the power allocation ratios of each of the candidate beam is equal to 1. This method is to increase the power allocation ratio of the candidate beam with a large receiving power to a certain extent, and allocate more resources for it. The decrease for the beams with lower receiving power can be either decreasing by equal difference or decreasing by equal proportion, and it is understandable that the specific decreasing value will be different based on the number of candidate beams. To avoid increasing the system power consumption, the sum of the power allocation ratios is equal to 1.

Strategy 3: Based on the number of the candidate beams z, the power allocation ratio of each candidate beam to be allocated is determined to be 1/z plus correction parameters; the correction parameters are determined based on the receiving power ordering, and the sum of the power allocation ratios of each candidate beam is equal to 1. Compared with the previous two strategies, this strategy is more flexible, where the correction parameters can be flexibly set based on sequencing, and it is understood that the correction parameters will be different for different beams to be selected, and some correction parameters will be positive and some negative so that the sum of the power allocation ratios is equal to 1. As an example, the power allocation ratio of the candidate beams with the receiving power sequencing in the first 50% can be increased by 5%, and the power allocation ratio of the candidate beams with the receiving power sequencing in the first 50% can be reduced by 5%.

It should be noted that the candidate beams to be allocated power referred to in the present application are only these candidate beams considered in the process of determining the power allocation ratio and are not equivalent to the actual power allocated to these candidate beams. The final actual candidate beam and the power distribution is based on the final target beam.

It is understandable that in the power allocation strategy, including but not limited to the aforementioned examples, only the number of candidate beams to allocate power is considered, or, combined with the order of the strength of the receiving power. The optimal allocation solution of the power allocation ratio in the specific environment is not a must, and the specific value of the power allocation ratio can be simply determined in practical applications. In some implementations, combined with the decision-making of the total receiving power or the determination of the second threshold, the optimal target beam combination based on the aforementioned power allocation strategy can be simply and directly determined.

After determining the target beam, the original vector of each target beam (that is, the excitation vector stored at the transmitting side) and the phase information fed back by the receiver can be combined to form the transmitted beam. Determine the transmitted beam based on the target beam and the beamforming strategy comprises:

S401, based on phase information compensation corresponding to the phase of the target beam.

S402, each target beam after compensating the phase term is superimposed according to the power allocation ratio to form a transmitted beam.

Assuming that the number of target beam is i, that is, beamforming is based on the first i candidate beam with the largest receiving power. The beamforming vectors of the i target beams are $B_1$ and $B_2, \ldots, B_i$, the phase information fed back by the receiver is described as $\varphi_1, \varphi_2, \ldots, \varphi_i$ then the formation vector c to form the target radiated beams can be represented by Formula 6:

$$C = \frac{1}{\eta} \sum_{i=1}^{I} B_i e^{-j\varphi_i} \tag{Formula 6}$$

Understandably, the properties of Formula 6 come from the superposition of electromagnetic fields, where the normalization factor $\eta$ is presented.

The above description only exemplifies a single-layer structure. In some embodiments, the communication system comprises at least two layers of structure or at least two receiving devices. For these scenarios, the beamforming vectors could be separately calculated. The total beamforming matrix could be composed of beamforming vectors of each layer. Assuming that there are F layers or F users in the entire system, the overall multilayer beamforming matrix C can be expressed as Formula 7:

$$C = \left[ \frac{1}{\eta_1} \sum_{i=1}^{I} B_{i,1} e^{-j\varphi_{i,1}}, \ldots, \right. \tag{Formula 7}$$

$$\left. \frac{1}{\eta_f} \sum_{i=1}^{I} B_{i,f} e^{-j\varphi_{i,f}}, \ldots, \frac{1}{\eta_F} \sum_{i=1}^{I} B_{i,f} e^{-j\varphi_{i,F}} \right]$$

12

In Formula 7 above, f represents the number of different layers or users, and F represents the total number of layers or total users.

The beamforming method of the presented embodiment is based on the order of the receiving power, selects the candidate beam as the target beam, which can complete simple and easy-to-use beamforming under the predetermined power allocation strategy, and can improve the performance of the system in some embodiments. The beamforming method of the presented embodiment may be applied to, but not limited to, NR (New Radio) system or other similar communication systems that beamforming can be performed. The transmitter of the presented embodiment includes, but is not limited to, a signal transmitting device such as a communication base station, and the receiving end includes, but is not limited to, the user's terminal or other equipment, and the device at the receiving end may be a mobile device such as a mobile terminal, or a non-mobile device.

Another optional embodiment of the present application:

In order to help on better understanding of the beamforming method of the present application, the presented embodiment is further described in conjunction with a more specific beamforming process:

This example uses the NR system as an example to illustrate an optional physical layer structure of the NR system, which uses CRC (Cyclic Redundancy Check) technology to increase the stability of the system, but it is understood that the specific coding verification method in practical application does not affect the beamforming process of the presented embodiment, and in practical application can use other verification methods or apply more communication technology means to form a communication system of other structures, which is only an example of a communication system.

Referring to FIG. 2, the NR system of this example includes, but is not limited to, a cyclic check code module 101, a channel coding module 102, a hybrid automatic retransmission module 103, a rate matching and scrambling module 104, a modulation module 105, a layer mapping module 106, a resource and port mapping module 107, a beamforming RF module 108, and an antenna system 109. The data 100 to be sent is represented binary in the physical layer, first by the cyclic check code module 101 additional cyclic redundancy check items, and the channel coding module 102 to encode the data 100, processed in the hybrid automatic retransmission module 103 and rate matching and scrambling by rate matching and scrambling module 104, modulated by the modulation module 105. Modulation module 105 includes, but is not limited to, data modulator, modulation scheme includes but is not limited to QPSK (Quadrature Phase-Shift Keying), 16QAM (Quadrature Amplitude Modulation), 64QAM and 256QAM, etc., the present application is not limited to this. Then, the modulated data 100 is mapped to different layers by the layer mapping module 106 to realize the MIMO (multiple input multiple output) of the system feature. Finally, the resource and port mapping module 107 will be the modulated data 100 associated with the physical resource, and port mapping, the data 100 through the port mapping through the beamforming RF module 108 to form the required beam and radio frequency, transmitted by the antenna system 109. If the transmission is carried out with a dual beam, the signal can be transmitted through two different beams, the first beam 110A and the second beam 110B, as shown in FIG. 2.

Figure 3:
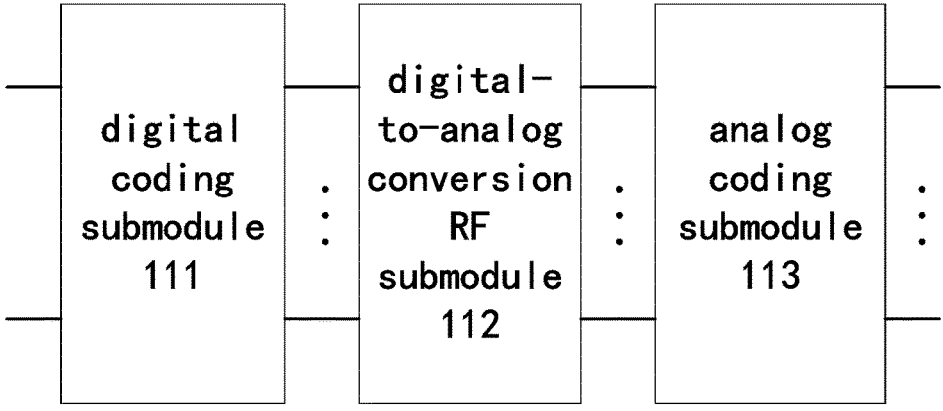
FIG. 3 is a schematic diagram of a beamforming module provided by another optional embodiment of the present application.

As a major component of the beamforming RF module 108, see FIG. 3, this example uses a hybrid beamforming RF module 108, which includes a digital coding submodule 111, a digital-to-analog conversion RF submodule 112 and an analog coding submodule 113. Understandably, in other examples, it is also possible to take only the digital beam-forming submodule or the analog beamforming submodule.

Figure 4:
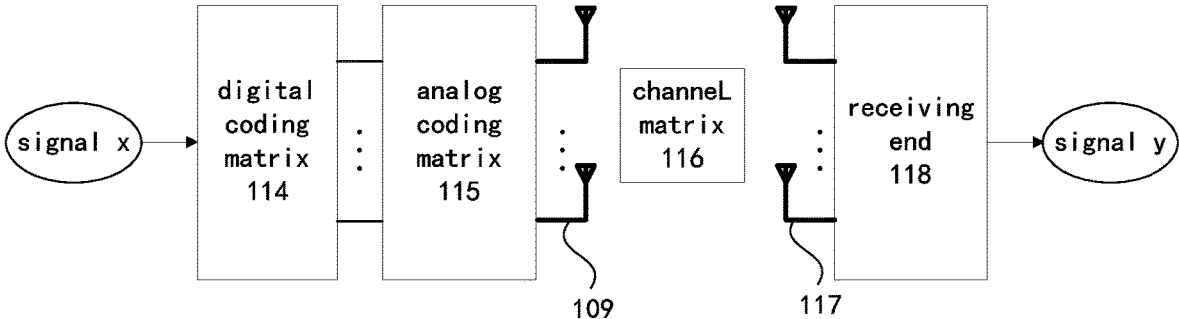
FIG. 4 is a schematic diagram of a mathematical model of the beamforming module provided by another optional embodiment of the present application.

Referring to FIG. 4, the mathematical representation of the beamforming RF module 108 described above. It should be noted that the mathematical model of the example is only a simple illustration, which ignores factors such as electro-magnetic compatibility problems (EMC), power amplifier leakage, etc. The signal x of the input beamforming RF module 108 is encoded for the first time by the digital coding module based on the digital coding matrix 114, and then the secondly encoded by the analog coding module based on the analog coding matrix 115, and then transmitted by the antenna system 109 of the transmitting end into the wireless environment. After multiple reflections, diffraction and the transmitted signal is received by the antenna system 117 of the receiving end 118, and finally the signal y received by the receiving end 118 may be represented by the following Formula 8:

$$y = HC_AC_Dx \qquad \text{(Formula 8)}$$

where x is the input signal vector of signal x, and its dimension is the number of MIMO layers multiplied by 1; $C_A$ is an analog coding matrix 114, the dimension of which is the number of transmitting antennas (N) multiplied by the number of transmitting antennas (N); $C_D$ is a digital coding matrix 115, and its dimension is the number of transmitting antennas multiplied by the number of MIMO layers; H is the channel matrix 116, whose dimension is the number of receiving antennas multiplied by the number of transmitting antennas; y is the vector of the received signal, and its dimension is the number of receiving antennas multiplied by 1.

For NR systems, in addition to the structure of the above example, it can also be configured by other feasible schemes, but it is understood that the communication system is capable of applying the beamforming method of the presented embodiment has at least the relevant modules to perform beamforming and the basic communication capabilities.

As shown in FIG. 5, the beamforming process for this example includes, but is not limited to:

S501, modify configurations at the transmitter side so that the receiver can feedback the measurement results.

For example, the protocol stack layer of the transmitter configures the resource RB (Resource Block) number/time slot to the receiver, so that the receiver could report the measurement results to the transmitter at a specific RB/time slot. These configurations made by the transmitter could be used to communicate with the receiver by the signal sent by the transmitter, and the information carrying these configurations can be a signal sent during a subsequent beam scan stage (S502).

S502, beam scanning at the transmitter side.

The process of beam scanning involves sending a measurement signal to the receiver using different beams at the transmitter and obtaining feedback from the receiver. See FIG. 6 for a schematic of beam scanning for this example, which is performed during an SS (synchronous signal) burst. Multiple beams are shown below for each SSB, wherein the beam w configured for the current SSB is shown in shade, which indicates the beam patterns of the SSB transmission based on beam w. Understandably, these beams are available, and these beams configured during the beam scanning process is the candidate beam. The individual beams w used above are shaped by the initial configuration of the excitation vectors ($B_1$, $B_2$, . . . , $B_M$), the excitation vector describes the specific morphology of each beam w, and after determining the target beam, the beam shaping matrix will also be generated based on the corresponding excitation vector of the target beam.

During the beam scan process, the receiver continuously measures the received signal quality which corresponds to each beam and feeds it back to the transmitter, and the transmitter records the measurement results fed back by the receiver for subsequent beamforming decisions. In this example, the receiver feeds back based on the RB/time slot configured for it by the transmitter.

It should be noted that the beam scanning method is not limited to the measurement of SSB indicated in this example. For example, it can also be fed back by CSI-RS (Channel State Information-Reference Signal) and obtain the measurement results of each sub-frequency, and then beamforming each sub-frequency.

The feedback information obtained by the transmitter includes but is not limited to the receiving power and phase information, and the receiving power and phase information are corresponding to the beam, and the corresponding relationship transmitter should be known.

S503, sort the receiving power of each beam.

This example still uses M beams as an example, numbered $P_1$, $P_2$ in order of receiving power, . . . , $P_M$. It is understandable that in practical applications, a better sorting method can be selected according to the actual number of beams.

S504, calculate the power threshold $TP_i$.

I is initially set to 2. After calculating the power threshold $TP_i$, perform step S505. $TP_i$ corresponds to power threshold calculation method at different values may refer to the description of formula 5 in the preceding embodiment. For illustrative purposes, in this example, the power threshold $TP_i$ is used directly as the second threshold.

S505, compare whether $P_{i+1}$ is less than the power threshold $TP_i$; if not, perform step S506; if yes, perform step S508.

S506, compare whether i is less than M; if so, perform step S507; if not, perform step S508.

S507, add 1 to the value of i, and go back to step S504.

S508, determine the i-beam with the highest receiving power as the target beam; construct the transmitted beams based on the target beams.

A beamforming matrix can be generated by combining the beamforming vectors of these target beams with the phase information fed back by the receiver. The beamforming method of the single-layer structure and the multilayer structure may refer to Formula 6 and Formula 7 of the preceding embodiment, which will not be repeated in this example.

As a detailed example, the entire system is transmitted through four transmitting antennas, as shown in Table 1 below, the beamforming vectors $B_1$, $B_2$ of the individual beams in the beam scanning phase . . . , $B_7$.

TABLE 1

$$B_1 = \begin{pmatrix} 1 \\ 1 \\ 1 \\ 1 \end{pmatrix}, B_2 = \begin{pmatrix} 1 \\ e^{j\frac{\pi}{4}} \\ e^{j\frac{\pi}{2}} \\ e^{j\frac{3\pi}{4}} \end{pmatrix}, B_3 = \begin{pmatrix} 1 \\ e^{j\frac{\pi}{2}} \\ e^{j\pi} \\ e^{j\frac{3\pi}{4}} \end{pmatrix}, B_4 = \begin{pmatrix} 1 \\ e^{j\frac{3\pi}{4}} \\ e^{j\frac{3\pi}{2}} \\ e^{j\frac{9\pi}{4}} \end{pmatrix}, B_5 = \begin{pmatrix} 1 \\ e^{-j\frac{\pi}{4}} \\ e^{-j\frac{\pi}{2}} \\ e^{-j\frac{3\pi}{4}} \end{pmatrix}, B_6 = \begin{pmatrix} 1 \\ e^{-j\frac{\pi}{2}} \\ e^{-j\pi} \\ e^{-j\frac{3\pi}{2}} \end{pmatrix}, B_7 = \begin{pmatrix} 1 \\ e^{-j\frac{3\pi}{4}} \\ e^{-j\frac{3\pi}{2}} \\ e^{-j\frac{9\pi}{4}} \end{pmatrix}$$

Assuming that the target beams are Beam 1 (the excision vector is B1) and Beam 4 (the extrusion vector is $B_4$), then the vector c of the shaped beam can be obtained by combining the corresponding extrusion vector with Formula 6 above, and the vector c of the formed beam in this example is Formula 9 below:

$$c = \begin{pmatrix} 0.674 \\ -0.070 + j0354 \\ 0.337 - j0.337 \\ 0.407 + j0.354 \end{pmatrix} \quad \text{(Formula 9)}$$

Understandably, the resulting beam shape consists of two physical beams that meet the goal of two-beam transmission, and the power of the two beams is the same if there is no preference for power distribution.

As an example of implementing a beamforming matrix, suppose that the desired beamforming vector c constructed by a mixed beamforming structure is Formula 10:

$$c = \left[ b_1 e^{-j\varphi_{b_1}} \, b_2 e^{-j\varphi_{b_2}} \dots b_N e^{-j\varphi_{b_N}} \right]^T \quad \text{(Formula 10)}$$

where N is the number of antenna ports, $b_1, \dots, b_N$ is the amplitude of the beamforming vector, $\varphi_{b_1}, \dots, \varphi_{b_N}$ which is the phase of the beamforming vector. The most direct method is to divide the beamforming vector C into two parts, the amplitude part and the phase part. Analog beamforming is easier to implement the phase terms, while digital beamforming is easier to implement the amplitude terms. The beamforming vector can then be converted to Formula 11:

$$c = \begin{bmatrix} e^{-j\varphi_{b_1}} & 0 & \dots & 0 \\ 0 & e^{-j\varphi_{b_2}} & \dots & 0 \\ \vdots & \vdots & \ddots & \vdots \\ 0 & 0 & \dots & e^{-j\varphi_{b_N}} \end{bmatrix} \begin{bmatrix} b_1 \\ b_2 \\ \vdots \\ b_N \end{bmatrix} = C_A C_D \quad \text{(Formula 11)}$$

The beamforming method exemplified in this embodiment, without complex algorithms such as water filling algorithms, determines the target beam through the second threshold. The information required to calculate the second threshold is also easy to measure and feedback at the receiving end, the beamforming method is simple and easy, and the receiving power is directly related to the system performance. The transmitted beam can achieve better communication quality, in a cost-effective way.

Figure 7:
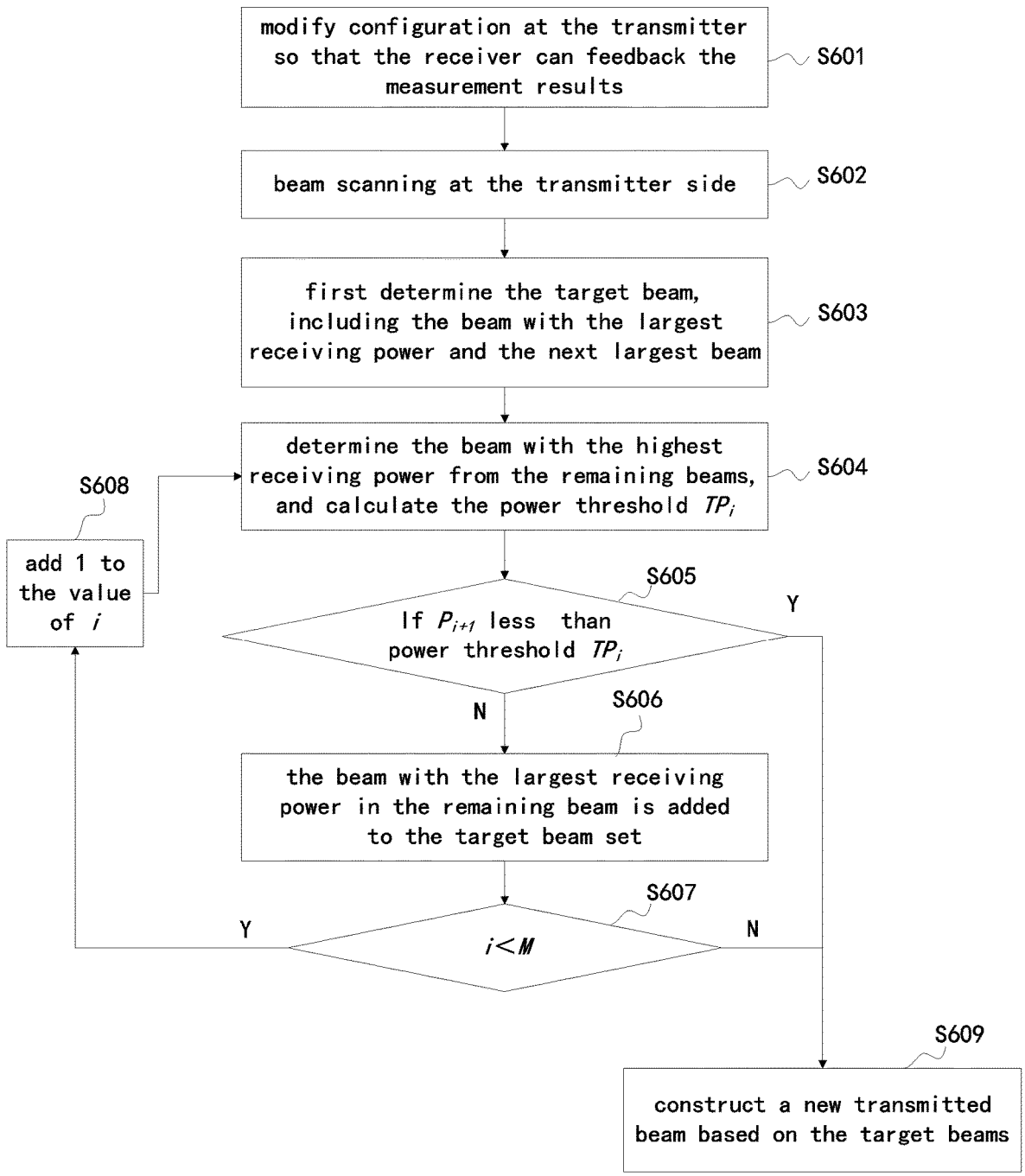
FIG. 7 is a schematic diagram of another process of beamforming provided by another optional embodiment of the present application.

As another example, see FIG. 7, the beamforming process for this example includes, but is not limited to:

S601, modify configuration at the transmitter so that the receiver can feedback the measurement results, S602, beam scanning at the transmitter side.

S603, first determine the target beam, including the beam with the largest receiving power and the next largest beam.

This example still uses M beams as an example, unlike the previous example, this example does not fully sort the receiving power, in this step, find the maximum value. However, for the sake of description, this example is still numbered as $P_1$, $P_2$ in order of receiving power, $\dots$, $P_M$.

S604, determine the beam with the highest receiving power from the remaining beams, and calculate the power threshold $TP_i$.

The value of i is initially set to 2, and the power threshold $TP_i$ is calculated and then step S605 can be deducted. The remaining beams also radiate the beams that have been determined as the target beam. Taking the first execution as an example, the beam corresponding to the receiving power $P_1$ and the receiving power $P_2$ has been determined as the target beam, then find the beam corresponding to the receiving power $P_3$. The power threshold $TP_i$ calculation method also refers to the description of the preceding embodiment, and the power threshold $TP_i$ is directly used as the second threshold in this example.

S605, compare and see whether $P_{i+1}$ is less than the power threshold $TP_i$; if not, go to step S606; if yes, go to step S609.

$P_{i+1}$ is the receiving power of the beam with the largest receiving power among the remaining beams determined in step S604.

S606, the beam with the largest receiving power in the remaining beam is added to the target beam set.

S607, compare whether i is less than M; if so, perform go to step S608; if not, execute step S609.

For example, if the maximum receiving power, that is, $P_3$, is found from the remaining beams, and if $P_3$ is chosen to be greater than the power threshold $TP_2$, the beam corresponding to $P_3$ is also determined to be the target beam. If i is less than M, go back to step S604, continue to find the maximum receiving power, that is, $P_4$, from the remaining beams, and compare $P_4$ with the power threshold $TP_3$. And so on until all the target beams have been identified.

S608, add 1 to the value of i, and go back to step S604.

S609, construct a new transmitted beam based on the target beams.

In this example, the receiving power is not pre-ordered, and the search is carried out directly from highest to lowest, and after all the target beams are determined, the order of the receiving power of the other candidate beams is no longer considered, and higher efficiency can be achieved in some implementations. It is understood that, in the absence of special instructions or affecting the implementation of its steps, the order of execution of some steps of the above example of the presented embodiment may be flexibly changed.

Figure 8:
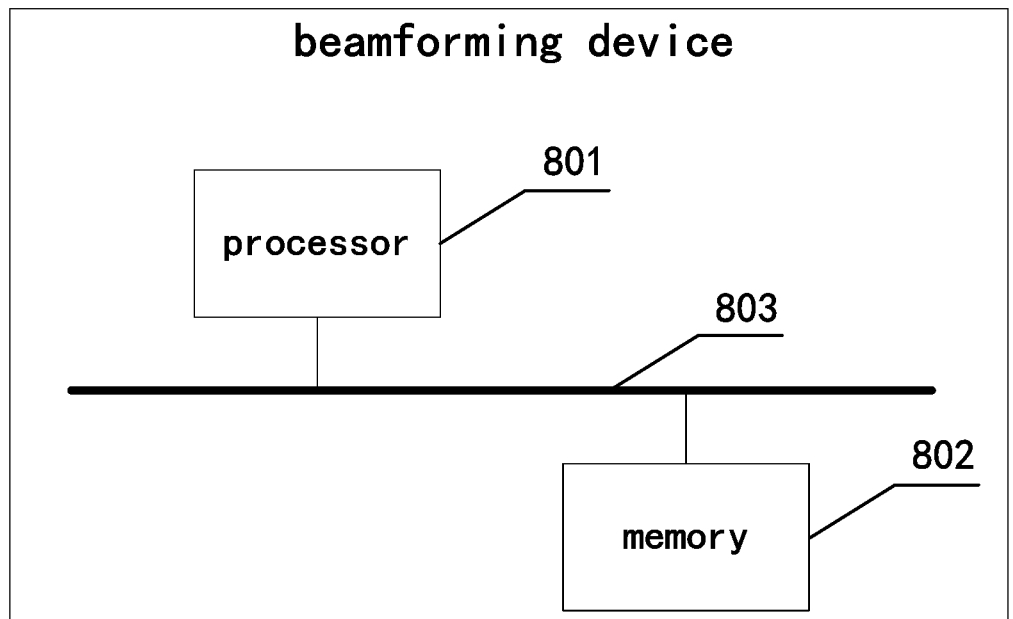
FIG. 8 is a schematic view of the structure of a beamforming device provided by another optional embodiment of the present application.

Another optional embodiment of the present application:

The presented embodiment also provides a beamforming device, as shown in FIG. 8, which includes a processor 801, a memory 802 and a communication bus 803;

the communication bus 803 is configured to realize the connection communication between the processor 801 and the memory 802;

the processor 801 is configured to execute one, or, more programs stored in memory 802 to implement the steps of the beamforming method such as the above embodiment.

The presented embodiment also provides a computer-readable storage medium, the computer-readable storage medium includes a volatile or non-volatile, removable or non-removable medium implemented in any method or technique for storing information (such as computer-readable instructions, data structures, computer program modules, or other data). Computer-readable storage media include, but are not limited to, RAM (Random Access Memory), ROM (Read-Only Memory), EEPROM (Electrically Erasable Programmable Read Only Memory), flash memory or other memory technology, CD-ROM (Compact Disc Read-Only Memory), DVD (Digital Versatile Disc) or other optical disk storage, magnetic cartridges, tapes, disk storage or other magnetic storage devices, or any other media that can be used to store desired information and can be accessed by a computer.

The computer-readable storage medium in the presented embodiment may be used to store one or more programs, and one or more programs stored therein may be executed by the processor to achieve the beamforming method of the above embodiment step.

Thus, those skilled in the art should be understood that all or some of the steps, systems, functional modules/units in the method disclosed above may be implemented as software (which may be implemented by computer program code executable of the computing device), firmware, hardware and appropriate combinations thereof. In hardware embodiments, the division between functional modules/units referred to in the above description does not necessarily correspond to the division of physical components; for example, a physical component may have a plurality of functions, or, a function or step may be performed by several physical components cooperatively. Some physical components or all physical components may be implemented as software executed by a processor, such as a central processing unit, digital signal processor or microprocessor, or, implemented as hardware, or, implemented as an integrated circuit, such as an application-specific integrated circuit.

Further, those of ordinary skill in the art are well known that the communication medium typically comprises computer-readable instructions, data structures, computer program modules, or, such as carriers or other transmission mechanisms and other data in a modulated data signal, and may include any information delivery medium. Therefore, the present application is not limited to any specific combination of hardware and software.

It should be understood that the application of the present application is not limited to the above examples, and to those of ordinary skill in the art, it may be improved or modified according to the above description. All such improvements and transformations shall fall within the scope of protection of the claims appended to the present application.

What is claimed is:

1. A beamforming method, comprising:

sending a measurement signal corresponding to each candidate beam of a plurality of candidate beams one by one, wherein each candidate beam is different from the other candidate beams, and wherein the measurement signal is a synchronization signal block (SSB) signal related to a transmitter configuring resources for a receiver;

obtaining receiving power and phase information of the measurement signal corresponding to each candidate beam received by a receiving end;

choosing at least two candidate beams as target beams according to an order of the receiving power from high to low and a power allocation strategy, wherein the power allocation strategy determines a power allocation ratio of each candidate beam to allocate a power, only based on a number of candidate beams to be allocated power, or the number of candidate beams selected to be allocated power as well as the ordering of the receiving power; and determining a beam for subsequent transmission based on the target beam and a beamforming strategy, the beam for subsequent transmission includes all target beams, and phase term of each target beam is compensated based on the phase information, the power allocation ratio based the power allocation ratio calculated in the power allocation strategy;

wherein choosing at least two candidate beams as the target beams according to the order of the receiving power from high to low and the power allocation strategy comprises:

increasing a number of target beams one by one in the order of the receiving power from high to low, until a total receiving power of the target beams meets preset conditions, or, the number of target beams reaches a predetermined maximum number, and the total receiving power is a theoretical total receiving power of the candidate beam under the corresponding power allocation ratio;

wherein increasing the number of target beams one by one in the order of the receiving power from high to low, until the total receiving power of the target beams meets the preset conditions, or the number of target beams reaches the predetermined maximum number comprises:

choosing i candidate beams as the target beams according to the order of the receiving power from high to low, a value of i gradually increases from 2 until any one of a first predetermined conditions is met;

the first predetermined conditions comprises an increase in the total receiving power of the first i+1 candidate beam compared to the total receiving power of a first i candidate beams does not exceed a first threshold, and the value of the first threshold is not lower than 0, and the value of i is equal to a maximum number of supported candidate beams.

2. The beamforming method according to claim 1, wherein a total transmitting power of transmitting the beam for subsequent transmission is same as a transmitting power of transmitting a single candidate beam.

3. The beamforming method according to claim 1, wherein the power allocation strategy comprises any of the following:

allocating the power according to the number the candidate beams z, the power allocation ratio of each candidate beam to be allocated is determined as $1/z$;

decreasing in the order of the receiving power from highest to lowest, the power allocation ratio of each candidate beam to be allocated, and a sum of the power allocation ratios of each of the candidate beam is equal to 1;

allocating the power according to the number the candidate beams z, the power allocation ratio of each candidate beam to be allocated is determined to be $1/z$ plus correction parameters, the correction parameters are determined based on the receiving power ordering, and the sum of the power allocation ratios of each candidate beam is equal to 1.

4. A beamforming device, wherein the beamforming device is comprised of a processor, a memory, and a communication bus, wherein the communication bus is configured to realize a connection communication between the processor and the memory, and wherein the processor is configured to execute one or more programs stored in memory to implement steps of the beamforming method of claim 1.

5. A non-transitory computer-readable storage medium, wherein the computer-readable storage medium stores one or more programs, wherein the one or more programs are executed by one or more processors to achieve the beamforming method of claim 1.

6. A beamforming method, comprising:

sending a measurement signal corresponding to each candidate beam of a plurality of candidate beams one by one, wherein each candidate beam is different from the other candidate beams, and wherein the measurement signal is a synchronization signal block (SSB) signal related to a transmitter configuring resources for a receiver;

obtaining receiving power and phase information of the measurement signal corresponding to each candidate beam received by a receiving end;

choosing at least two candidate beams as target beams according to an order of the receiving power from high to low and a power allocation strategy, wherein the power allocation strategy determines a power allocation ratio of each candidate beam to allocate a power, only based on a number of candidate beams to be allocated power, or the number of candidate beams selected to be allocated power as well as the ordering of the receiving power; and determining a beam for subsequent transmission based on the target beam and a beamforming strategy, the beam for subsequent transmission includes all target beams, and phase term of each target beam is compensated based on the phase information, the power allocation ratio based the power allocation ratio calculated in the power allocation strategy;

wherein choosing at least two candidate beams as the target beams according to the order of the receiving power from high to low and the power allocation strategy comprises:

increasing a number of target beams one by one in the order of the receiving power from high to low, until a total receiving power of the target beams meets preset conditions, or, the number of target beams reaches a predetermined maximum number, and the total receiving power is a theoretical total receiving power of the candidate beam under the corresponding power allocation ratio, wherein increasing the number of target beams one by one in the order of the receiving power from high to low, until the total receiving power of the target beams meets the preset conditions, or the number of target beams reaches the predetermined maximum number comprises:

obtaining a second threshold corresponding to the first i candidate beams in the order of the receiving power from high to low, the second threshold satisfies following conditions, if the receiving power of i+1 candidate beams is not lower than the second threshold, the total receiving power of the first i+1 candidate beams is not lower than the total receiving power of the first i candidate beams;

choosing i candidate beams as the target beams according to the order of the receiving power from high to low, the value of i gradually increases from 2 until any of a second predetermined conditions is met;

the second predetermined conditions comprises the receiving power of the candidate beam in the i+1 is not higher than the second threshold, and the value of i is equal to the maximum number of supported candidate beams.

7. The beamforming method according to claim 6, wherein obtain the second threshold corresponding to the first i candidate beams in the order of the receiving power from high to low comprises:

calculating a power threshold, the total receiving power of the first i+1 candidate beams is equal to the total receiving power of the first i candidate beams, and the power threshold is used as the second threshold.

8. The beamforming method according to claim 6, wherein obtaining the second threshold corresponding to the first i candidate beams in the order of the receiving power from high to low comprises:

calculating the power threshold, the total receiving power of the first i+1 candidate beams is equal to the total receiving power of the first i candidate beams, and the power threshold is compensated to obtain the second threshold.

* * * * *